(12) United States Patent
Boeger et al.

(10) Patent No.: US 9,899,134 B2
(45) Date of Patent: Feb. 20, 2018

(54) BURST PROTECTOR FOR HIGH-VOLTAGE DEVICE

(71) Applicant: Maschinenfabrik Reinhausen GmbH, Regensburg (DE)

(72) Inventors: Christian Boeger, Regensburg (DE); Klaus Schlepp, Maxhuette-Birkenhoehe (DE); Dara Roy, Regensburg (DE); Juergen Niesner, Lappersdorf (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 8 days.

(21) Appl. No.: 14/899,589

(22) PCT Filed: Jun. 24, 2014

(86) PCT No.: PCT/EP2014/063263
§ 371 (c)(1),
(2) Date: Jan. 18, 2016

(87) PCT Pub. No.: WO2015/007478
PCT Pub. Date: Jan. 22, 2015

(65) Prior Publication Data
US 2016/0148742 A1    May 26, 2016

(30) Foreign Application Priority Data
Jul. 16, 2013 (DE) .................. 10 2013 107 559

(51) Int. Cl.
*F16K 17/14*    (2006.01)
*H01F 27/02*    (2006.01)
(Continued)

(52) U.S. Cl.
CPC ............ *H01F 27/02* (2013.01); *F16K 17/40* (2013.01); *H01F 27/402* (2013.01);
(Continued)

(58) Field of Classification Search
CPC .. H01F 27/02; H01F 27/402; H01F 2027/404; H01H 33/55; H01H 33/00;
(Continued)

(56) References Cited

U.S. PATENT DOCUMENTS 1,220,296 A * 3/1917 Vanderford ............ A01G 25/16
220/243
1,847,628 A * 3/1932 Salmond .................. A62C 3/06
169/66
(Continued)

FOREIGN PATENT DOCUMENTS

DE        1721316 B    8/1955
DE         229764 B   11/1985
(Continued)

*Primary Examiner* — Minh Le
(74) *Attorney, Agent, or Firm* — Andrew Wilford

(57) ABSTRACT

The invention relates to a bursting device (1) for a high-voltage device (2). The bursting device (1) is suitable in particular for on-load tap changers or high-voltage transformers filled with a filling medium such as gas or oil. The bursting device (1) according to the invention has a bursting cork (3) with support blocks (7) arranged on the inner surface (3B). A shear pin (8) is in arranged in each receiving block (7), said shear pin being divided into a first portion (8A) and a second portion (8B). The first portion (8A) of the shear pin (8) protrudes into the receiving block (7). The second portion (8B) of the shear pin (8) is arranged below the circumferential edge (9) of an opening (5) of the high-voltage device (2).

12 Claims, 4 Drawing Sheets

(51) Int. Cl.
*H01H 33/00* (2006.01)
*H01F 27/40* (2006.01)
*F16K 17/40* (2006.01)
*H01H 9/00* (2006.01)
*H01H 33/55* (2006.01)

(52) U.S. Cl.
CPC .......... *H01H 9/0005* (2013.01); *H01H 33/00* (2013.01); *H01F 2027/404* (2013.01); *H01H 9/0044* (2013.01); *H01H 33/555* (2013.01)

(58) Field of Classification Search
CPC .... H01H 9/0005; H01H 9/0044; F16K 17/00; F16K 17/40; Y10T 137/1624; Y10T 137/1639; Y10T 137/1662; Y10T 137/1669; Y10T 137/1677; Y10T 137/1684; Y10T 137/1707
USPC .............. 137/68.23, 68.11, 67, 68.16, 68.17; 52/213, 209, 204.52, 223, 453, 223.2
See application file for complete search history.

(56) References Cited

U.S. PATENT DOCUMENTS

| | | | | |
|---|---|---|---|---|
| 1,874,931 A | * | 8/1932 | Dougherty | F16K 17/14 137/68.22 |
| 3,512,317 A | * | 5/1970 | Lynch | B67D 7/3209 137/68.16 |
| 3,571,977 A | * | 3/1971 | Abeel | B64C 1/1446 244/129.5 |
| 3,782,411 A | * | 1/1974 | Turner | F16K 17/00 137/467 |
| 3,972,442 A | * | 8/1976 | Malcolm | B65D 90/36 116/200 |
| 4,005,341 A | * | 1/1977 | Uptegraff, Jr. | H01F 27/02 137/541 |
| 4,181,238 A | * | 1/1980 | Arnold | F16J 13/20 220/203.07 |
| 4,235,347 A | * | 11/1980 | Cothier | G01R 1/04 137/68.11 |
| 4,276,725 A | * | 7/1981 | Ash | E04B 1/98 49/141 |
| 4,342,988 A | * | 8/1982 | Thompson | F16K 17/16 137/554 |
| 4,550,743 A | * | 11/1985 | McFarlane | F16K 17/16 137/68.16 |
| 4,656,793 A | * | 4/1987 | Fons | B65D 90/36 52/1 |
| 4,750,303 A | * | 6/1988 | Mullen | B65D 90/10 52/1 |
| 4,768,675 A | * | 9/1988 | Coleman | B65D 90/34 220/203.24 |
| 4,899,960 A | * | 2/1990 | Hararat-Tehrani | B64C 1/18 137/68.11 |
| 5,085,017 A | * | 2/1992 | Hararat-Tehrani | B64C 1/18 244/118.5 |
| 5,155,471 A | * | 10/1992 | Ellis | F16K 17/16 116/266 |
| RE34,308 E | * | 7/1993 | Thompson | F16K 17/1606 137/554 |
| 5,242,069 A | * | 9/1993 | Hertrampf | B65D 51/1661 215/260 |
| 5,460,285 A | * | 10/1995 | Harding, Sr. | F16J 13/18 220/203.01 |
| 6,070,365 A | * | 6/2000 | Leonard | B65D 90/36 52/1 |
| 6,147,581 A | * | 11/2000 | Rancourt | H01F 27/02 336/65 |
| 6,595,716 B1 | * | 7/2003 | VanDeVyvere | B65D 90/10 404/26 |
| 6,698,690 B2 | * | 3/2004 | Novak | B64C 1/1423 244/118.5 |
| 7,275,560 B2 | * | 10/2007 | Rogge | F24F 11/022 137/526 |
| 8,657,234 B2 | * | 2/2014 | Guillaume | B64D 29/06 244/129.4 |
| 8,915,260 B2 | * | 12/2014 | Klein | F16K 15/06 137/15.19 |
| 9,021,764 B2 | * | 5/2015 | Yoon | B60J 1/006 296/190.08 |
| 9,199,789 B2 | * | 12/2015 | Jakus | B65D 90/34 |
| 2012/0200961 A1 | * | 8/2012 | Magnier | H01F 27/402 361/37 |

FOREIGN PATENT DOCUMENTS

| | | | |
|---|---|---|---|
| DE | 20016065 U | 1/2001 | |
| DE | 102013107559 A | 1/2015 | |
| EP | 2520836 A1 * | 11/2012 | ........ F16K 17/0413 |
| KR | 101229732 B | 2/2013 | |

* cited by examiner

BURST PROTECTOR FOR HIGH-VOLTAGE DEVICE

CROSS REFERENCE TO RELATED APPLICATIONS

This application is the US-national stage of PCT application PCT/EP2014/063263 filed 24 Jun. 2014 and claiming the priority of German patent application 102013107559.2 itself filed 16 Jul. 2013.

FIELD OF THE INVENTION

The invention relates to a burst protector for a high-voltage device. In particular, the burst protector comprises at least one cover that closes an opening, that is formed in a wall of the high-voltage device, and that has an inner periphery. The burst protector is suitable for on-load tap changers or high-voltage transformers filled with a filling medium such as gas or oil.

BACKGROUND OF THE INVENTION

High-voltage device such as, for example, high-voltage transformers are very hot during operation due to the high levels of current and voltage. For this reason, the transformer windings are arranged in a so-called tank. This tank is hermetically closed and filled with a transformer oil. Through a cooling circuit, the transformer oil is used for the purpose of keeping the operating temperature low. However, during operation it is possible for the transformer oil to heat extremely rapidly as a consequence of, for example, winding short-circuits and to thereby expand. The expansion of the transformer oil can have the consequence that the tank does not withstand the pressure, uncontrollably ruptures and parts of the tank are flung around. In order to be able selectively compensate for a pressure rise of that kind pre-defined rupture locations in the form of burst discs are introduced into the tank, thus the housing of the high-voltage transformer.

High-voltage device safeguarded from pressure waves and filled with insulating liquid and/or with gas is known from DE 17 21 316 U. This high-voltage device has an opening that is closed by means of a burst disk. The burst disk consists of hard paper that is covered on the inner side by a metal foil. The hard-paper disk as well as the metal foil are screw-connected by a ring to the housing wall of the high-voltage device. The hard-paper disk is sealed relative to the housing wall and to the ring in each instance by a rubber sealing ring.

A particular disadvantage with this burst disk is the constructional format thereof and the material used. In order to protect the part that consists of hard paper, from the aggressive oil it is essential to use a metal foil. However, at the time of assembly it can easily happen that the metal foil is off-center, the aggressive oil penetrates to the hard-paper disk and the high-voltage device is no longer correctly sealed. A further disadvantage is that the hard-paper disk is very sensitive. During maintenance operations it can happen that an engineer unintentionally steps on the membrane and destroys this. A further problem with the hard-paper solution is the longevity thereof. Due to external influences the material can fatigue and rupture at even a small rise in pressure. Faulty triggering of that kind is connected with a high level of maintenance outlay and is thus undesirable. Since the hard-paper disk is formed homogenously over the entire area it cannot be predicted how this would rupture in the case of a sudden pressure rise.

A voltage converter with a surrounding casing as a protective device is known from DE 20 016 065 U1. Excess-pressure safety means is arranged on the upper side of the casing. The excess-pressure safety means is a burst protector with an opening closed by a burst film. On reaching a specific pressure in the voltage converter the burst film ruptures.

In the case of this burst protector as well, the material used is to be regarded as a weak point. Since the film is exposed to weathering, in the course of time material fatigue can occur. Thus, it is also possible here for the foil to rupture at significantly lower pressure than originally defined and undesired, faulty triggering to occur. Moreover, here as well, destruction of the burst film can occur due to inattention during maintenance operations, since this film is not protected from the action of force.

OBJECT OF THE INVENTION

It is therefore the object of the invention to provide a burst protector that is economic, servicing-friendly, long-life, insensitive relative to external weathering influences, able to be simply mounted and exchanged and reliably triggers in the case of disturbance.

SUMMARY OF THE INVENTION

The burst protector according to the invention for a high-voltage device comprises at least one cover that closes an opening, that has an inner periphery, formed in a wall of the high-voltage device. The cover comprises a burst plug having an outer face and an inner face turned toward the high-voltage device. The inner face of the burst plug has at least one mounting block. A respective shear pin is seated in the at least one mounting block. The shear pin is divided into a first section and a second section. The first section of the shear pin is seated in the at least one mounting block or projects thereinto. The second section of the shear pin is arranged below the inner periphery of the opening.

In a further embodiment a respective support block that is fastened to the inner periphery of the opening by a catch element, is associated with each mounting block. In that case, the second section of the shear pin is seated in the support block or projects thereinto.

In a further embodiment at least one securing pin is connected with the inner face of the burst plug and with the inner periphery of the opening.

In a further embodiment the burst plug has a peripheral flange that rests on an annular step of the opening. The flange of the burst plug and an edge face perpendicular to the axis of the opening, of the high-voltage device each carry a respective seal that fits complementarily with the annular step of the opening. A compression spring can be arranged in the direction of the axis of the opening between the flange of the burst plug and the wall of the high-voltage device.

The shear pin preferably has a fracture zone between the first section and the second section. The inner face of the burst plug has three mounting blocks. In that case a support block is associated with each mounting block so that a respective shear pin projects into the mounting block and the support block.

In a further embodiment two securing elements are connected with the inner face of the burst plug and with the inner periphery of the opening.

The burst plug and the at least one mounting block are preferably unitarily formed with each other.

The burst protector is suitable for use in high-voltage device, particularly an on-load tap changer or a high-voltage transformer.

BRIEF DESCRIPTION OF THE DRAWING

The invention and advantages thereof are described in more detail in the following with reference to the accompanying drawings in which.

Figure 1:
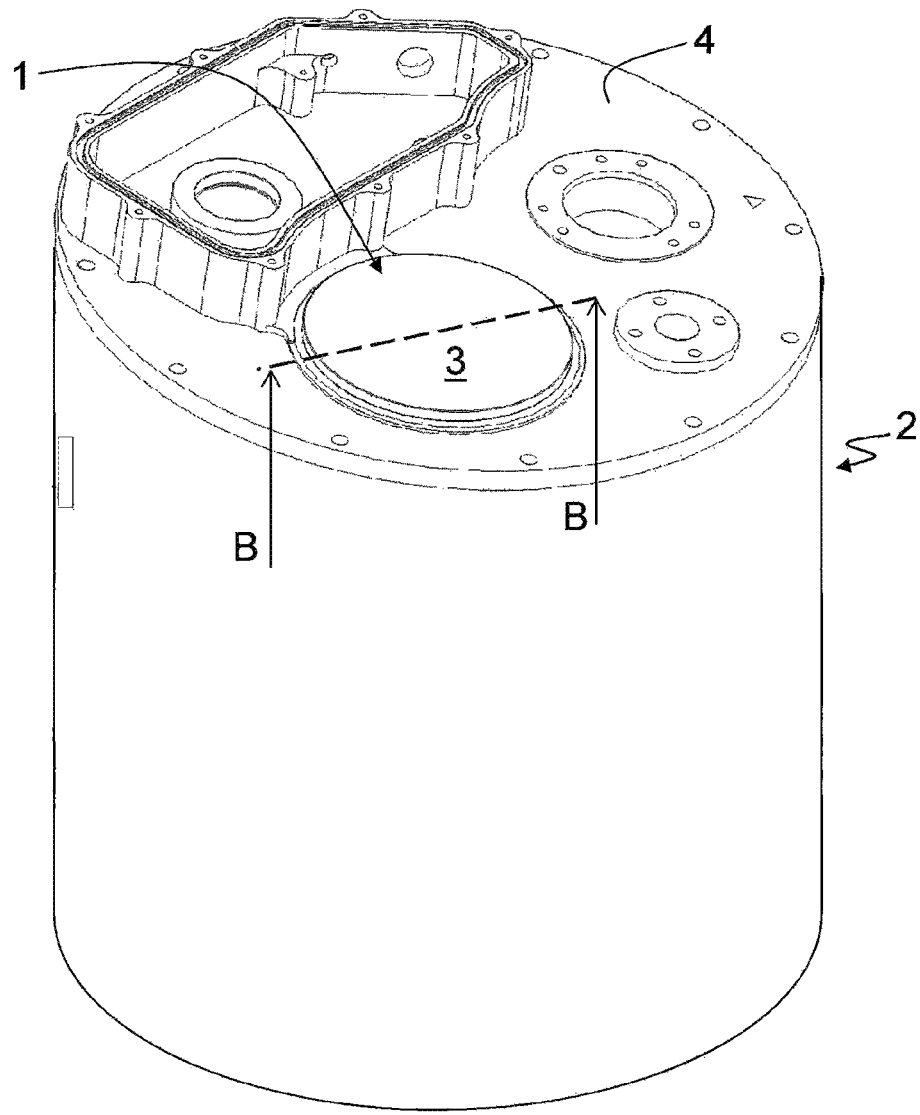
FIG. 1 shows an embodiment of the burst protector according to the invention in a high-voltage device.

Identical reference numerals are used for the same or equivalent elements of the invention. Moreover, for the sake of clarity only reference numerals are illustrated in the individual figures that are required for the description of the respective figure. The illustrated forms of embodiment merely represent examples of how the burst protector can be constructed and thus do not represent a definitive limitation of the invention.

SPECIFIC DESCRIPTION OF THE INVENTION

FIG. 1 shows high-voltage device 2 in a wall 4 or a wall part of which is installed one embodiment of the burst protector 1 according to the invention. The burst protector 1 comprises, as a cover with at least one burst plug 3 that closes the high-voltage device 2 toward the outside. The high-voltage device 2 can be, for example, an on-load tap changer. However, the burst protector 1 can also be mounted on any high-voltage device 2, such as, for example, a high-voltage transformer filled with a medium such as oil or gas. In the embodiment shown here, the wall 4 is a cover of a load changeover switch and the burst protector 1 is provided in the cover 4.

Figure 2:
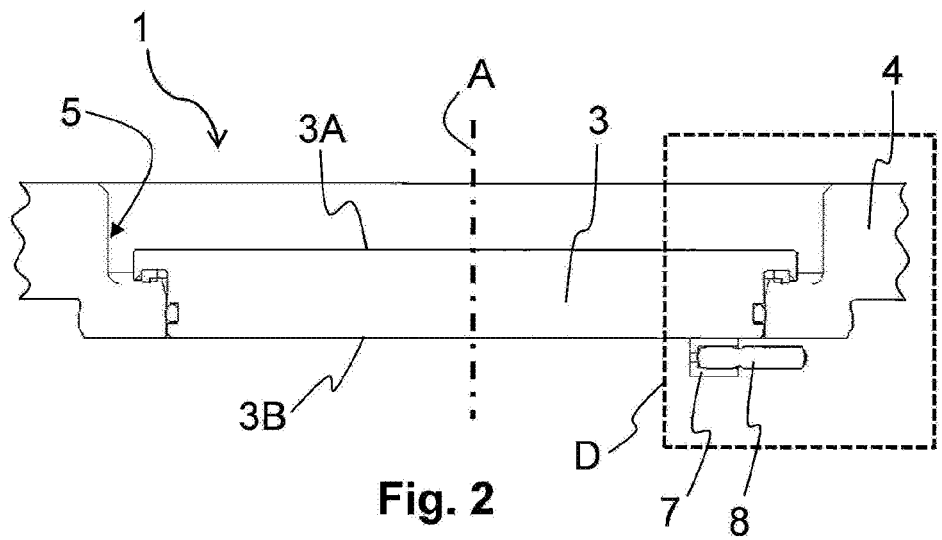
FIG. 2 is a section through the burst protector taken along line B-B of FIG. 1.

FIG. 2 shows how the burst protector 1 comprises, as a cover, at least the burst plug 3 that is in an opening 5 of the wall 4 of the high-voltage device 2. The burst plug 3 has an outer face 3A that is exposed to the external environment of the high-voltage device 2. In addition, the burst plug 3 has an inner face 3B that delimits the interior space of the high-voltage device 2. The opening 5 in the wall 4 is in that case centered on an axis A of the opening 5.

Figure 3:
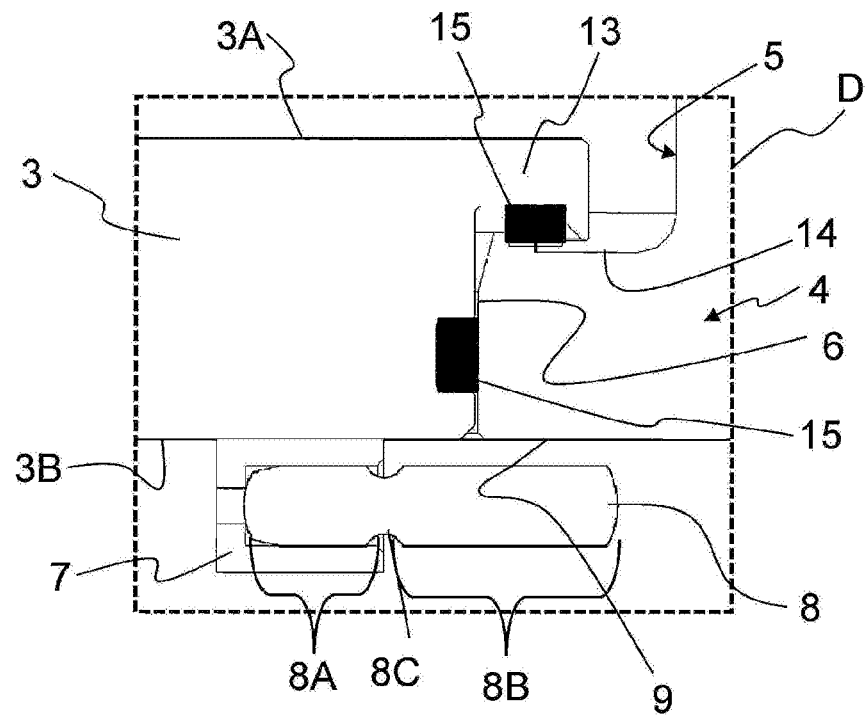
FIG. 3 is a large-scale view of the region indicated in FIG. 2 by D.

FIG. 3 shows that the burst plug 3 is seated in the opening 5 of the wall 4. Provided on the inner face 3B of the burst plug is at least one mounting block 7 in which a shear pin 8 is seated or fitted. The shear pin 8 has a first section 8A and a second section 8B. The first section 8A projects at least partly into the mounting block 7. The second section 8B of the shear pin 8 is below the inner periphery 9 of the opening 5 and/or directly at the inner periphery 9. In addition, the shear pin 8 preferably has a fracture zone 8C.

In the event of a sudden pressure rise in the interior of the high-voltage device 2 (see FIG. 1), the transformer oil, for example, presses against the inner face 3B of the burst plug 3B. Above a specific pressure level the shear pin 8 fails and the pressure can escape past the then-opened burst plug 3. In particular, the shear pin 8 is formed with the fracture zone 8C so that if a fixed pressure is exceeded the shear pin 8 always breaks in defined manner at this fracture zone 8C. The burst plug 3 frees the opening 5 in the wall 4 of the high-voltage device 2 and the excess pressure can selectively decay.

Moreover, the burst plug 3 has a peripheral flange 13 that, when a burst plug 3 is inserted in the opening 5, rests on an annular step 14 of the opening 5. The opening 5 is closed by co-operation of flange 13 and step 14.

At least one seal 15 and/or compression spring (not illustrated here) can be provided between the flange 13 and the annular step 14. The seal 15 fits complementarily with the annular step 14 of the opening 5. The provision of a compression spring prevents the burst plug 3 from being seated too loosely at the opening 5.

Figure 4:
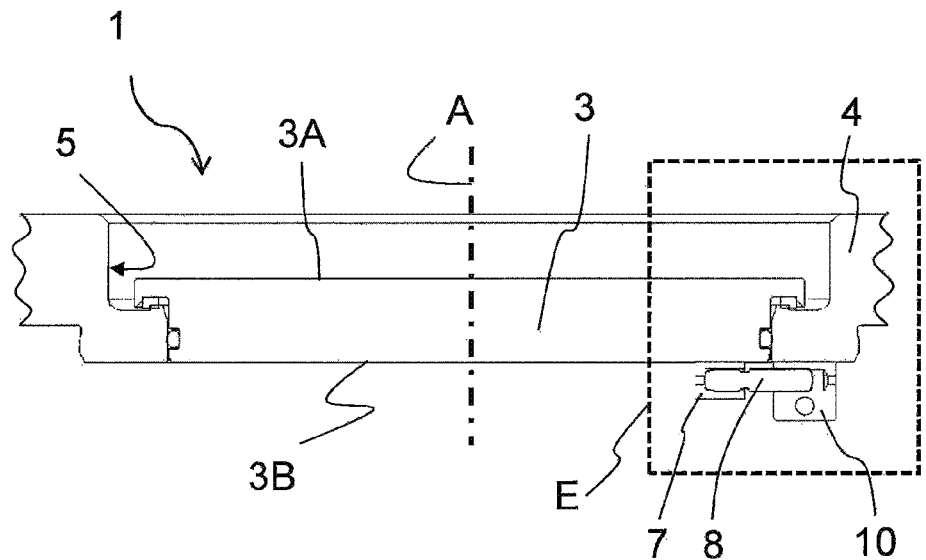
FIG. 4 section through another embodiment of the burst protector according to the invention along line B-B of FIG. 1.

FIG. 4 shows a second embodiment of the burst protector 1 in which at least one mounting block 7 and a support block 10 corresponding therewith are associated with the burst plug 3. For securing purposes, the shear pin 8 projects into the mounting block 7 and the support block 10.

Figure 5:
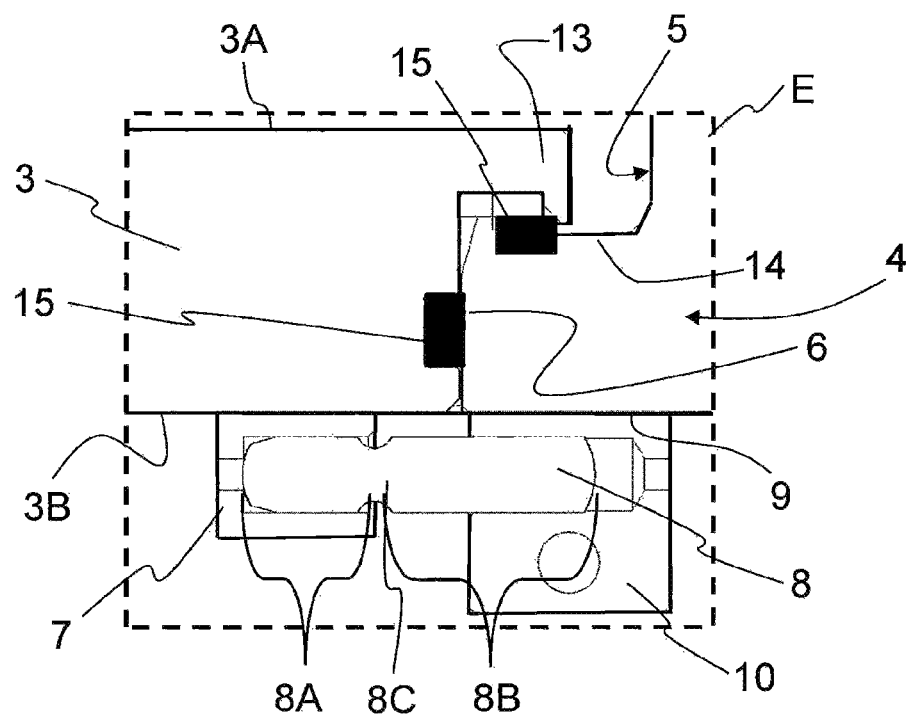
FIG. 5 is a large-scale view of the region indicated in FIG. 4 by E.

FIG. 5 shows how the second section 8B of the shear pin 8 projects into the support block 10. The first section 8A of the shear pin 8 projects into the mounting block 7. The mounting block 7 is fixed to the inner face 3B of the burst plug 3. The support block 10 is so mounted at the inner periphery 9 of the opening 5 that it is directly opposite the mounting block 7.

Figure 6:
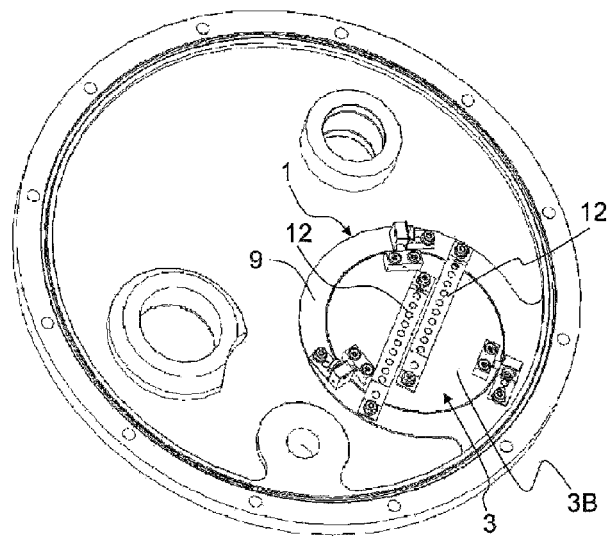
FIG. 6 is a perspective view of an embodiment of the burst protector according to the invention from below, where the burst protector is integrated in a wall of the high-voltage device.
Figure 7:
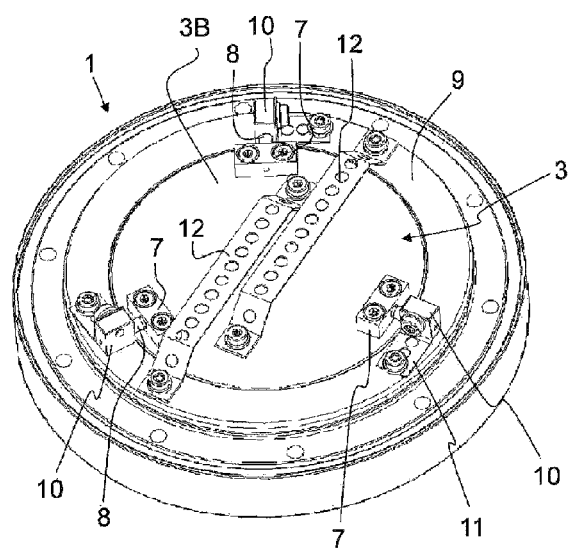
FIG. 7 is a perspective view of a detail of the burst protector of FIG. 6.

FIG. 6 and FIG. 7 show an embodiment of the burst protector 1 according to the invention with a burst plug 3 in perspective view from below, for example in accordance with the embodiments according to FIGS. 1 to 5. In particular, the inner face 3B of the burst plug 3 is illustrated. Each support block 10 (see FIG. 4) is fastened to the inner periphery 9 of the opening 5 preferably by a catch element 11. The catch element 11 can preferably be a perforated strip. In addition, at least one securing element 12 is provided that connects the inner face 3B of the burst plug 3 with the inner periphery 9 of the opening 5. The securing element 12 can preferably also be a perforated strip. The securing element 12 is, for example and as illustrated here, screw-connected with the inner face 3B of the burst plug 3 and with the inner periphery 9 of the opening 5. Equally, the catch element 11 is, for example, screwed to the inner periphery 9 of the opening 5. The mounting block 7 is, for example, screwed to with the inner face 3B of the burst plug 3.

In the event of a pressure rise in the interior of the high-voltage device 2 beyond a predefined threshold, then, for example, the transformer oil presses against the inner face 3B of the burst plug 3. If the pressure should exceed a value fixed by the shear pin 8, in particular the fracture zone 8C thereof, it breaks and the burst plug 3 frees the opening 5 in the wall 4 of the high-voltage device 2. Since the second section 8B of the shear pin 8 projects into the support block 10 and this in turn is secured to the inner periphery 9 of the opening 5 by the retaining element 11, the second section 8B of the shear pin 8 is prevented from dropping into the interior of the high-voltage device 2. Equally, the first section 8A of the shear pin 8 is fixed in the mounting block 7. Contamination of the high-voltage device 2 by parts of a destroyed shear pin 8 is prevented. Since the burst plug 3 is fastened to the inner periphery 9 of the opening 5 by at least one securing element 12 the burst plug 3 is prevented from being flung in uncontrolled manner into the environment of the high-voltage device 2. The burst plug 3 is preferably secured by two securing elements 12 and three shear pins 8. Consequently, here three mounting blocks 7 with corresponding support blocks 10 are provided.

In addition, it is conceivable for the burst plug 3 and the mounting blocks 7 to be made from a cast part. In one embodiment of that kind the mounting blocks 7 are fixedly integrated into the burst plug 3.

Figure 8:
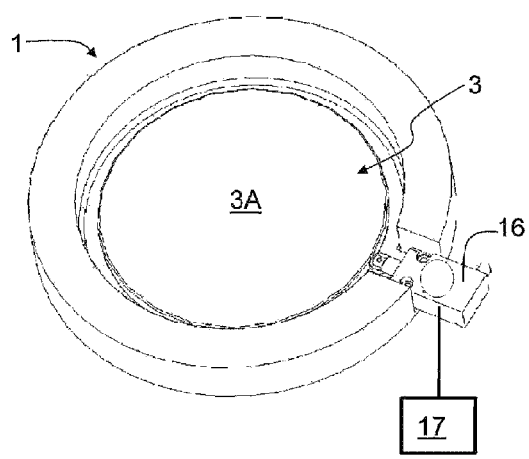
FIG. 8 is a perspective view from above of a detail of a further embodiment of the burst protector according to the invention.

FIG. 8 shows a burst protector 1 according to the invention with an additional sensor 16. The sensor 16 detects triggering of the burst protector 1. so that opening of the burst plug 3, is reported by a digital signal to a central monitoring unit 17 of the high-voltage device 2. This can be realized by, for example, a microswitch whose actuating lever in untriggered state of the burst protector 1 presses against the burst plug 3 and, after triggering, is relaxed. In addition, an analog sensor 16 is also usable. This can be constructed as, for example, a vane (semaphore) that erects when the burst plug 3 is urged upward.

The burst protector 1 according to the invention is thus economic, easily serviced, long-lived, insensitive relative to external weathering influences, able to be simply mounted and exchanged and reliably triggers in the case of disruption.

The burst plug 3 is protected from external force influences above all by the flange 13 in conjunction with the annular step 14. An unintended supporting or treading on the burst plug 3 at the time of servicing operations now no longer leads to destruction thereof, since the burst plug has a sufficient thickness and stability to resist these unintended loads during a service interval. The burst plug 3 preferably consists of metal so that even weathering has no significant influence on the longevity thereof.

Through the additional catch blocks 10 parts of the shear pins 8 can, if necessary, be collected. This is particularly advantageous primarily in the case of use of the burst protector 1 in an on-load tap changer.

Due to the fact that only the shear pins 8 are broken in the event of triggering of the burst protector 1 the size of the opening to be freed is uniquely defined by the size of the burst pug 3. A controlled decay of pressure is thus ensured.

The securing element 12 that prevents the burst plug 3 from being flung in uncontrolled manner into the environment of the high-voltage device 2 causing damage, and forms a further advantage.

The invention claimed is:

1. A burst protector for a high-voltage device having a wall formed with an opening, the burst protector comprising:

at least one burst plug that closes the opening formed in the wall of the high-voltage device and having an inner periphery, the burst protector having an inner face turned toward the high-voltage device and an outer face;

a mounting block on the inner face of the burst plug;

a support block fastened to the inner periphery of the opening adjacent the mounting block; and a shear pin seated in the mounting block and subdivided into a first section in the mounting block and a second section that is below the inner periphery of the opening and seated in the support block.

2. The burst protector according to claim 1, further comprising:

a catch element securing the support block to the wall at the inner periphery of the opening.

3. The burst protector according to claim 1, further comprising:

a securing element connected with the inner face of the burst plug and with the inner periphery of the opening.

4. The burst protector according to claim 1, wherein the burst plug has a peripheral flange that rests at the inner periphery on an annular step of the opening.

5. The burst protector according to claim 4, further comprising:

an annular seal between the flange of the burst plug and an annular edge face extending perpendicular to an axis of the opening of the high-voltage device.

6. The burst protector according to any claim 1, wherein the shear pin has a fracture zone between the first section and the second section.

7. The burst protector according to any claim 1, wherein the inner face of the burst plug is provided with three mounting blocks each juxtaposed with a respective support block, and a respective shear pin projects into each mounting block and the respective support block.

8. The burst protector according to claim 3, wherein two of the securing elements are connected with the inner face of the burst plug and with the inner periphery of the opening.

9. The burst protector according to claim 1, wherein the burst plug and the mounting block are unitarily formed with each other.

10. The burst protector according to claim 1, further comprising:

a sensor that generates an analog or digital signal after opening of the burst plug.

11. The burst protector according to claim 10, wherein the sensor is a microswitch or vane.

12. The burst protector according to claim 1, wherein the high-voltage device is an on-load tap changer or a high-voltage transformer.

* * * * *